US008087695B2

(12) United States Patent
Fügel et al.

(10) Patent No.: US 8,087,695 B2
(45) Date of Patent: Jan. 3, 2012

(54) MOBILE MACHINE WITH SUPPORTING LEGS

(75) Inventors: Dietmar Fügel, Wolfschlugen (DE); Christian Stirm, Aichwald (DE)

(73) Assignee: Putzmeister Engineering GmbH, Aichtal (DE)

( * ) Notice: Subject to any disclaimer, the term of this patent is extended or adjusted under 35 U.S.C. 154(b) by 685 days.

(21) Appl. No.: 12/223,213

(22) PCT Filed: Jan. 17, 2007

(86) PCT No.: PCT/EP2007/000346

§ 371 (c)(1),
(2), (4) Date: Jul. 24, 2008

(87) PCT Pub. No.: WO2007/093255

PCT Pub. Date: Aug. 23, 2007

(65) Prior Publication Data

US 2010/0148482 A1 Jun. 17, 2010

(30) Foreign Application Priority Data

Feb. 14, 2006 (DE) ......................... 10 2006 006 978

(51) Int. Cl.
*B60S 9/02* (2006.01)

(52) U.S. Cl. ............... 280/766.1; 280/763.1; 280/764.1; 280/765.1

(58) Field of Classification Search ............... 280/763.1, 280/764.1, 765.1, 766.1
See application file for complete search history.

(56) References Cited

U.S. PATENT DOCUMENTS

| | | | | | |
|---|---|---|---|---|---|
| 2,580,545 | A | * | 1/1952 | Hill | 280/475 |
| 3,104,891 | A | * | 9/1963 | Dalton | 280/763.1 |
| 3,489,428 | A | * | 1/1970 | Hunter et al. | 280/765.1 |
| 3,716,252 | A | * | 2/1973 | Johnson | 280/766.1 |
| 3,767,226 | A | * | 10/1973 | Stephens | 280/764.1 |
| 3,801,068 | A | * | 4/1974 | Kopas | 254/419 |
| 3,871,685 | A | * | 3/1975 | Senelet | 280/766.1 |
| 3,874,696 | A | * | 4/1975 | Gardner et al. | 254/419 |
| 3,879,055 | A | * | 4/1975 | Sill et al. | 280/763.1 |

(Continued)

FOREIGN PATENT DOCUMENTS

DE 2 402 141 7/1974

(Continued)

OTHER PUBLICATIONS

International Search Report.

*Primary Examiner* — J. Allen Shriver, II
*Assistant Examiner* — Jacob Meyer
(74) *Attorney, Agent, or Firm* — Collard & Roe, P.C.

(57) ABSTRACT

The invention relates to a mobile work machine, particularly a concrete pump truck. The work machine comprises a chassis (10) that has at least four wheels (11) that belong to a wheel axle, in pairs. Furthermore, at least two support legs (20) disposed laterally on the chassis, in pairs, are provided, which legs have a telescope segment configured as an extension tube (28) articulated onto the chassis (10), and a foot part (24) that can be extended downward, in telescope-like manner, and supported on the ground, preferably by hydraulic means. In order to guarantee simple handling of the support mechanism, it is proposed, according to the invention, that the extension tube (28) of the support legs (20) is configured in the manner of a two-arm lever, forming a lower lever arm (40), with reference to the pivot axis (34), which contains the foot part (24), and an upper lever arm (42), preferably spring-supported in the pivoting-out direction.

12 Claims, 5 Drawing Sheets

U.S. PATENT DOCUMENTS

Figure 1A:
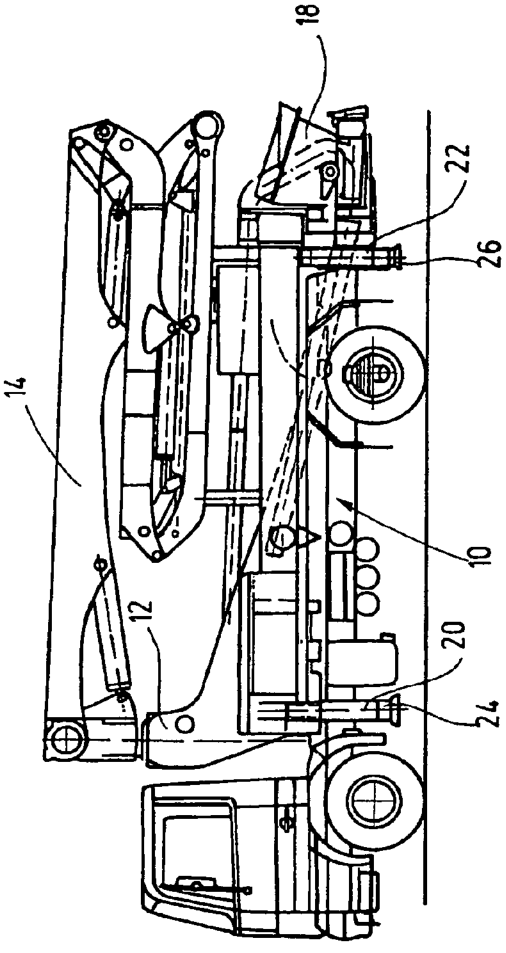

| | | | | | |
|---|---|---|---|---|---|
| 3,909,040 | A | * | 9/1975 | Visser | 280/765.1 |
| 3,945,666 | A | * | 3/1976 | Fritsch | 280/765.1 |
| 4,084,777 | A | * | 4/1978 | Lambert | 248/287.1 |
| 4,148,162 | A | * | 4/1979 | Goodrich | 52/23 |
| 4,245,855 | A | | 1/1981 | Larson | |
| 5,387,071 | A | * | 2/1995 | Pinkston | 414/563 |
| 5,901,980 | A | * | 5/1999 | Few et al. | 280/763.1 |
| 6,089,603 | A | * | 7/2000 | Ackley | 280/765.1 |
| 6,102,438 | A | * | 8/2000 | Few et al. | 280/763.1 |
| 6,224,102 | B1 | * | 5/2001 | Nebel | 280/765.1 |
| 6,311,954 | B1 | * | 11/2001 | Breslin et al. | 254/420 |
| 6,511,279 | B1 | * | 1/2003 | Harkcom et al. | 414/537 |
| 6,516,917 | B1 | * | 2/2003 | Mayer et al. | 182/17 |
| 6,726,236 | B2 | * | 4/2004 | Cofer | 280/475 |
| 2006/0186657 | A1 | * | 8/2006 | Peveler | 280/763.1 |
| 2007/0182148 | A1 | * | 8/2007 | Perkins | 280/766.1 |

FOREIGN PATENT DOCUMENTS

| | | |
|---|---|---|
| DE | 30 10 197 | 10/1980 |
| DE | 29 46 554 | 5/1981 |
| DE | 30 11 877 | 10/1981 |
| DE | 93 14 904 | 3/1995 |
| FR | 2 600 599 | 12/1987 |
| GB | 1128109 | 9/1968 |
| GB | 1173785 | 12/1969 |
| WO | WO 02/49954 | 6/2002 |

* cited by examiner

MOBILE MACHINE WITH SUPPORTING LEGS

This application is the National Stage of PCT/EP2007/000346 filed on Jan. 17, 2007, which claims priority under 35 U.S.C. §119 of German Application No. 10 2006 006 978.1 filed on Feb. 14, 2006. The international application under PCT article 21(2) was not published in English.

The invention relates to a mobile work machine having a chassis that has at least four wheels that belong to a wheel axle, in pairs, having at least two support legs disposed laterally on the chassis, in pairs, which legs have an extension tube articulated onto the chassis or onto a chassis boom, by way of a pivot axis that is preferably horizontal, and having a foot part that can be extended downward, in telescope-like manner, and supported on the ground, preferably by hydraulic means.

Mobile work machines, such as mobile concrete pumps, must be set up in stable manner on the substratum at the work site or construction site. The support legs disposed in the region of the front and/or rear axles serve for this purpose.

Mobile work machines of this type are known (DE-U-9314904 and DE-A-3011877), in which the front support legs, in each instance, can be pivoted on the chassis between a folded-in vertical travel position and a folded-out position pointing forward at a slant. There, the support legs are articulated onto the chassis with the rear, upper end of the extension tube. This arrangement has proven to be disadvantageous both with regard to handling of the support legs during the pivoting process and with regard to the transfer of force in the folded-out state.

The invention is therefore based on the task of improving a mobile work machine of the type indicated initially, in such a manner that handling of the support legs during the pivoting-out process is facilitated, and their bracing on the chassis can be improved.

To accomplish this task, the combination of characteristics indicated in claim 1 is proposed. Advantageous embodiments and further developments of the invention are evident from the dependent claims.

The solution according to the invention proceeds from the idea that the extension tube of the support legs is configured in the manner of a two-arm lever, forming a lower lever arm, with reference to the pivot axis, which contains the foot part, and an upper lever arm, preferably spring-supported in the pivoting-out direction. In this connection, it is practical if the lower lever arm of the extension tube is longer than the upper lever arm. It has proven to be particularly advantageous for discharge of the support forces if the upper lever arm rests against an end stop fixed on the chassis or the boom in the region of its free end, in the pivoted-out state of the support leg in question. It is advantageous if the upper lever arm engages into an oblong hole guide in the region of its free end, the one end of which hole forms the end stop. In this connection, it is practical if the pivot axis of the support legs is oriented at a slant to the longitudinal chassis axis, whereby it is advantageous if the pivot axes of the front support legs, which are assigned to one another in pairs, converge in the travel direction of the chassis. In this way, the result is achieved that the front support legs are folded out to the front at a slant, with reference to the chassis.

Another preferred embodiment of the invention provides that a pressure spring, preferably configured as a gas pressure spring, engages on the upper lever arm of the extension tube. In this connection, it is practical if the pressure spring is disposed in such a manner that the lever arm overcomes a dead point between the folded-in and the folded-out end position, on the pivot path of the support leg. In this way, the result can be achieved that the lever arm is biased in a stable contact position, both in the folded-in end position and in the folded-out end position of the support leg, under the effect of the pressure spring.

Furthermore, it has proven to be particularly advantageous if the pivot angle of the support legs about the pivot axis amounts to 20° to 30°. It is advantageous if the foot part carries a rigid foot plate, which is inclined at an angle that corresponds to the pivot angle, relative to the extension direction of the foot part. Fundamentally, it is possible that the foot plate is disposed on the foot part so as to pivot, by way of a foot joint.

For easier handling, the extension tube of the support leg has a handle that points in the pivoting-out direction.

In order to achieve greater operational safety, the support leg can be locked in place in its pivoting position, both in the folded-in position and in the folded-out position, relative to the chassis. For this purpose, a locking mechanism that can be locked to the pivoting leg is provided on the chassis.

Figure 2:
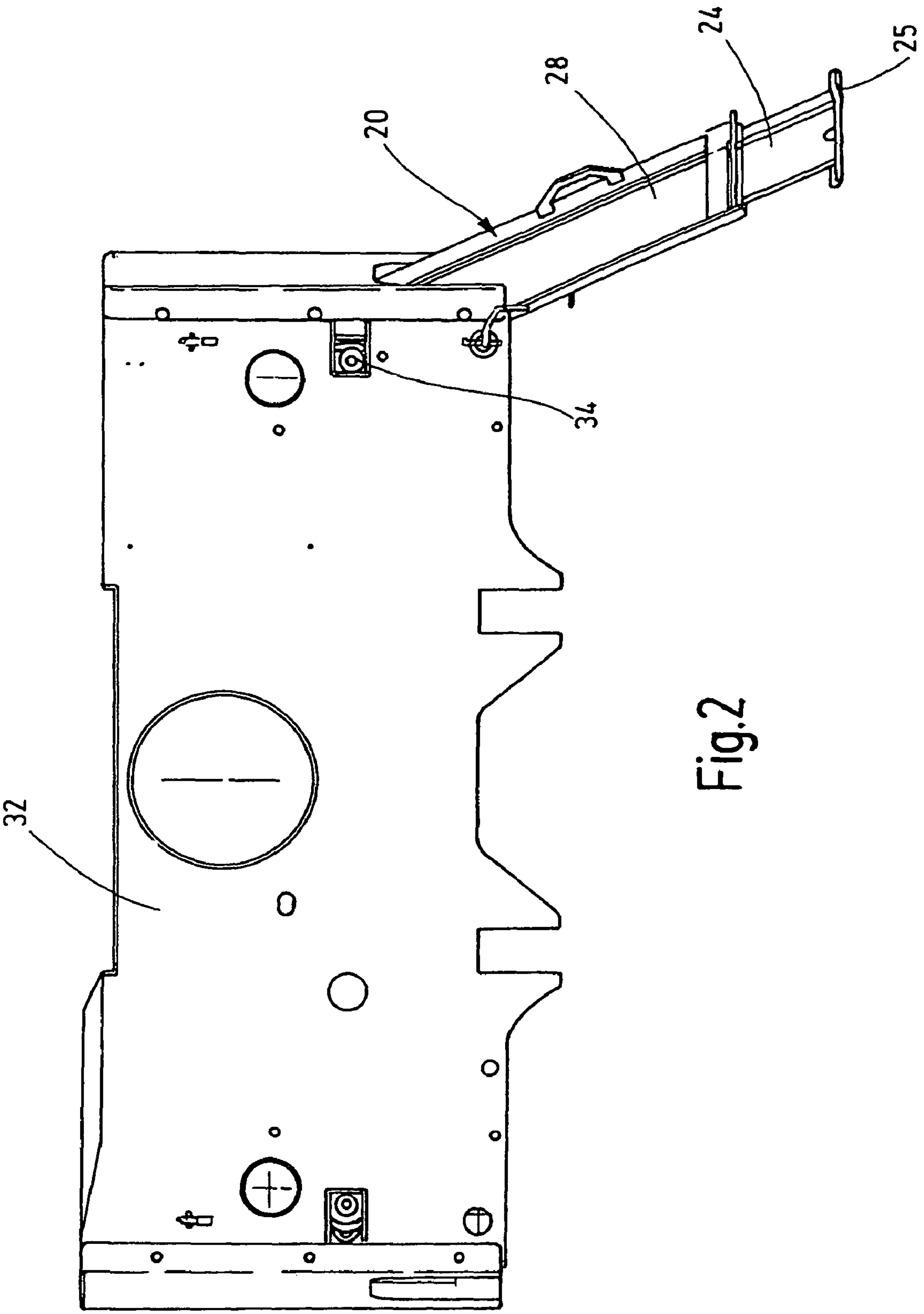
Figure 3A:
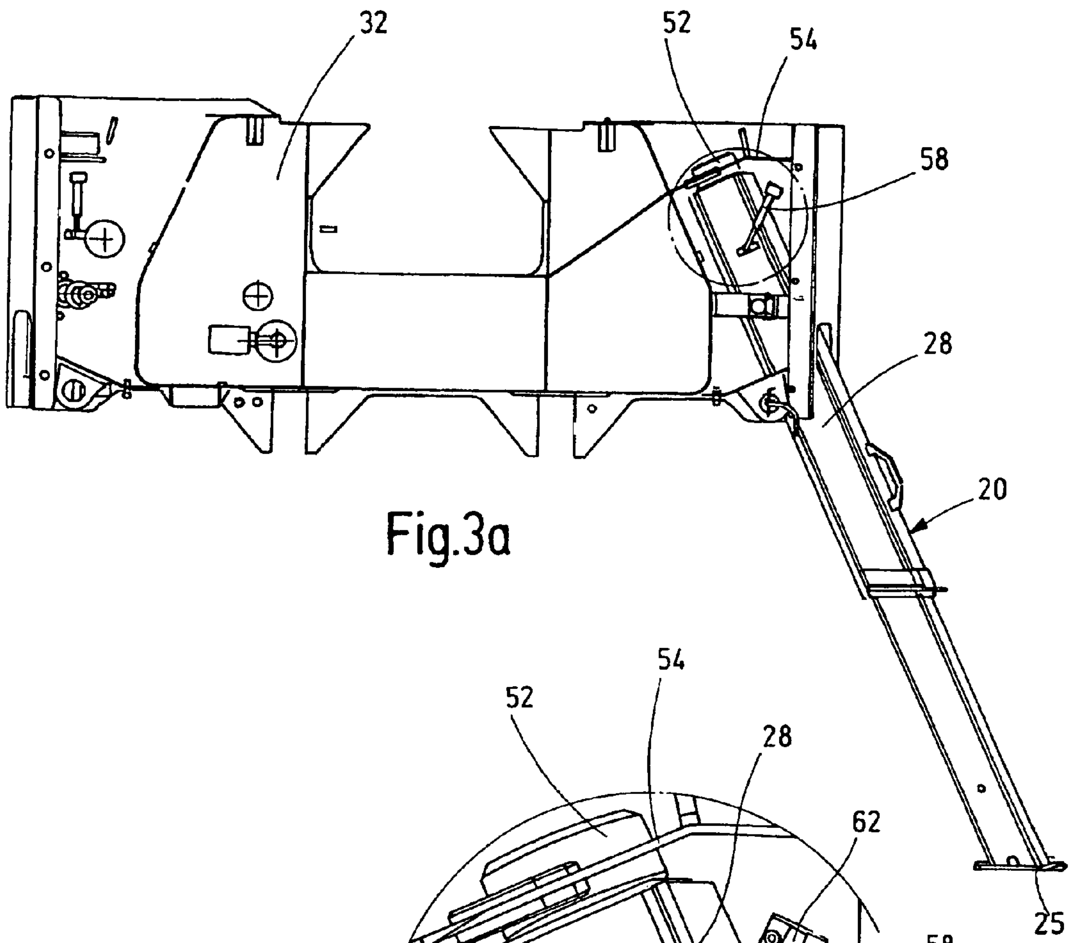
Figure 3B:
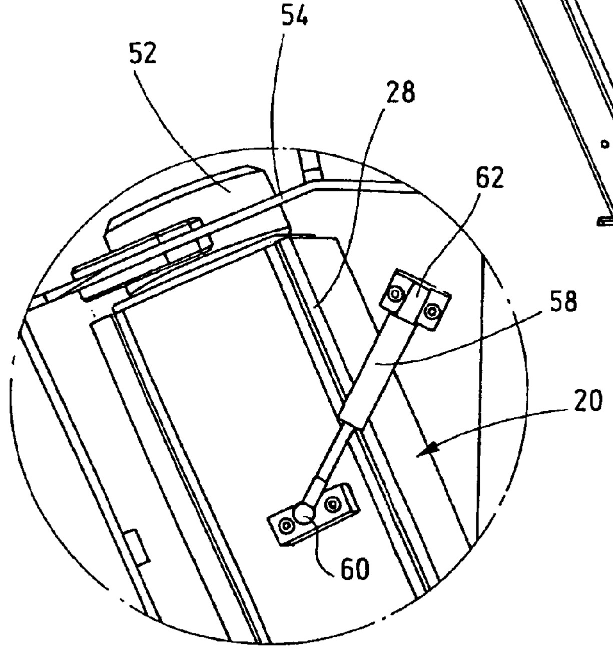
Figure 4:
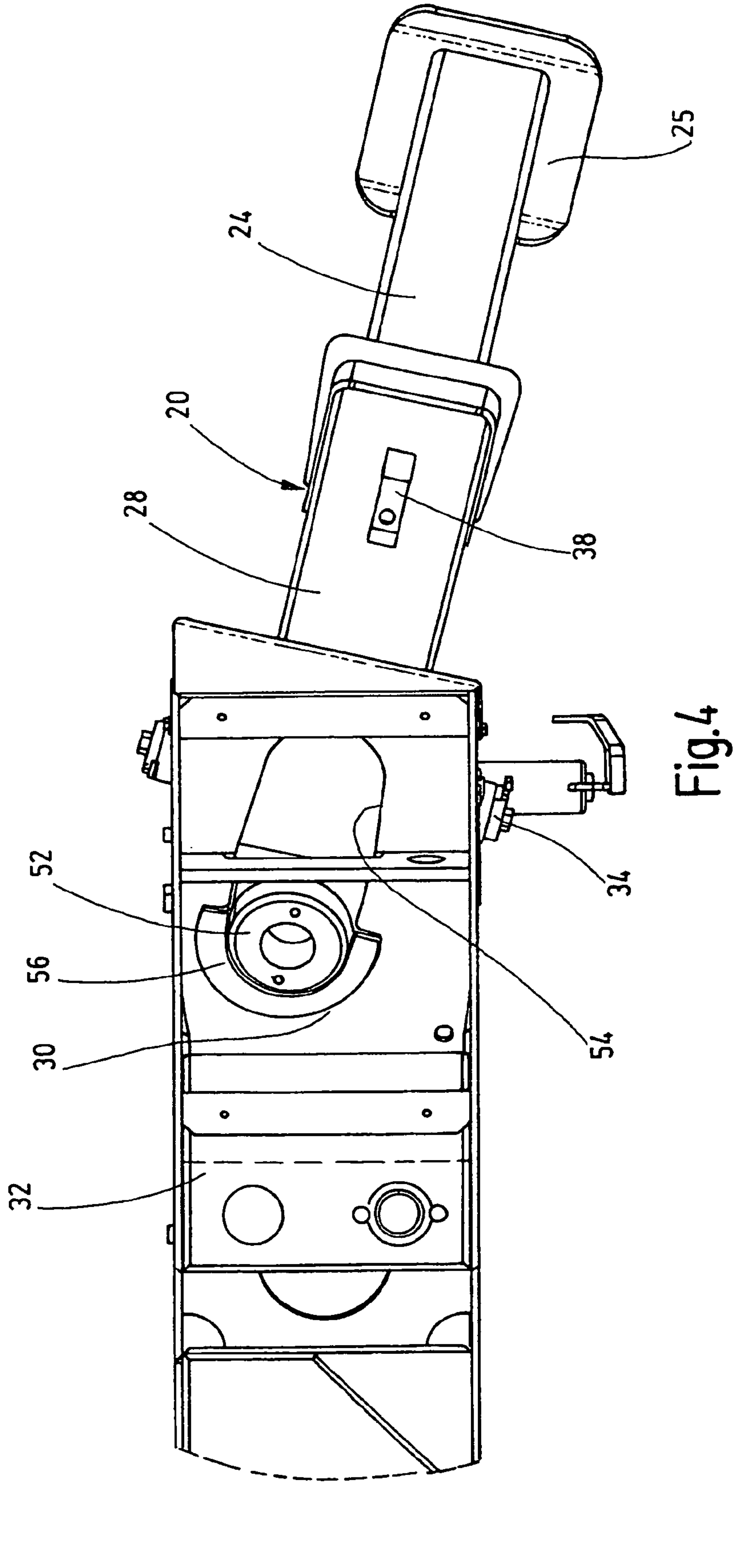
Figure 6:
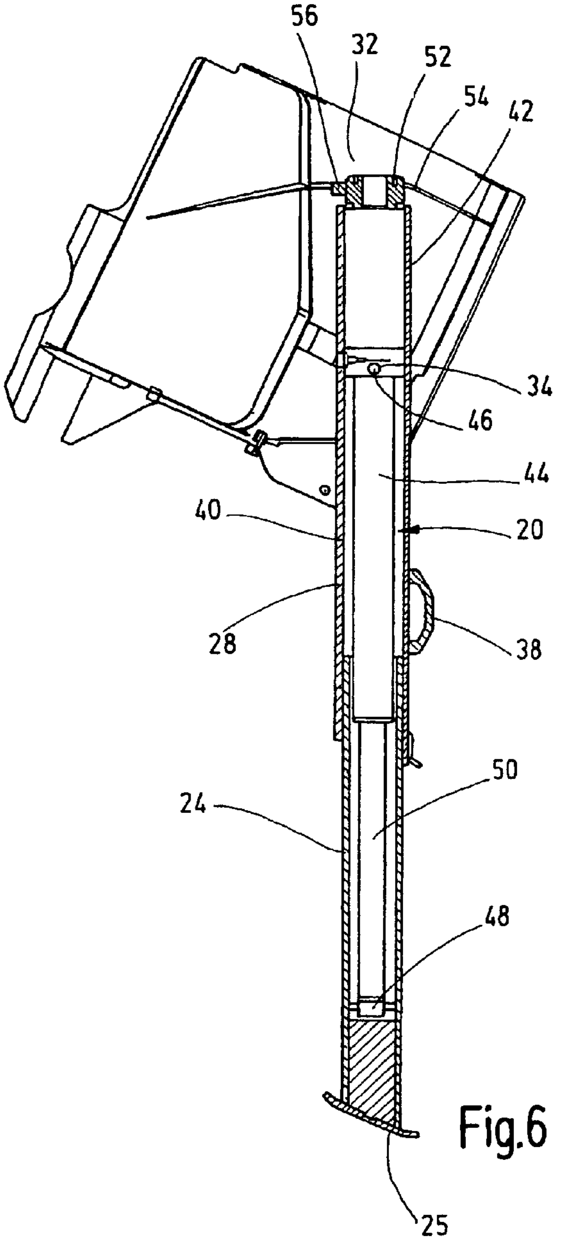
Figure 5:
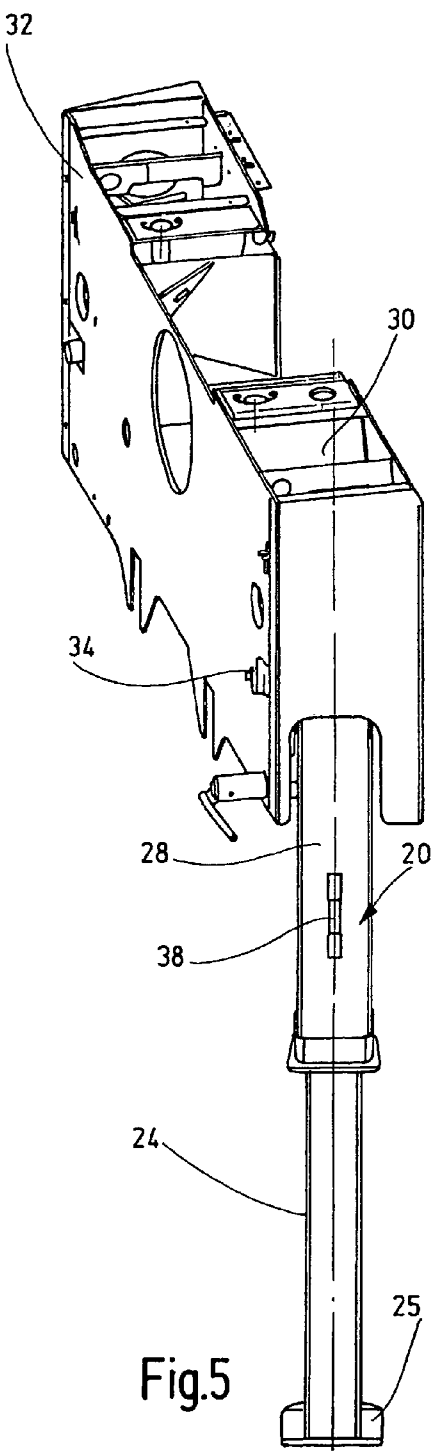

In the following, the invention will be explained in greater detail using exemplary embodiments shown schematically in the drawing. This shows:

FIGS. 1*a* and *b*, a side view of a concrete pump truck in the travel position and in the raised operating position;

FIG. 2 a front view of a traverse affixed to the chassis, with the support leg pivoted out and the foot part retracted;

FIG. 3*a* a partially broken-up front view of the traverse affixed to the chassis, with the support leg pivoted out and the foot part extended;

FIG. 3*b* a detail of FIG. 3*a* in the region of the gas pressure spring;

FIG. 4 a top view of the traverse affixed to the chassis, with the support leg pivoted out;

FIG. 5 an illustrative representation of the traverse, with the support leg extended, in a side view;

FIG. 6 a section along the section line A-A of FIG. 5.

Figure 1B:
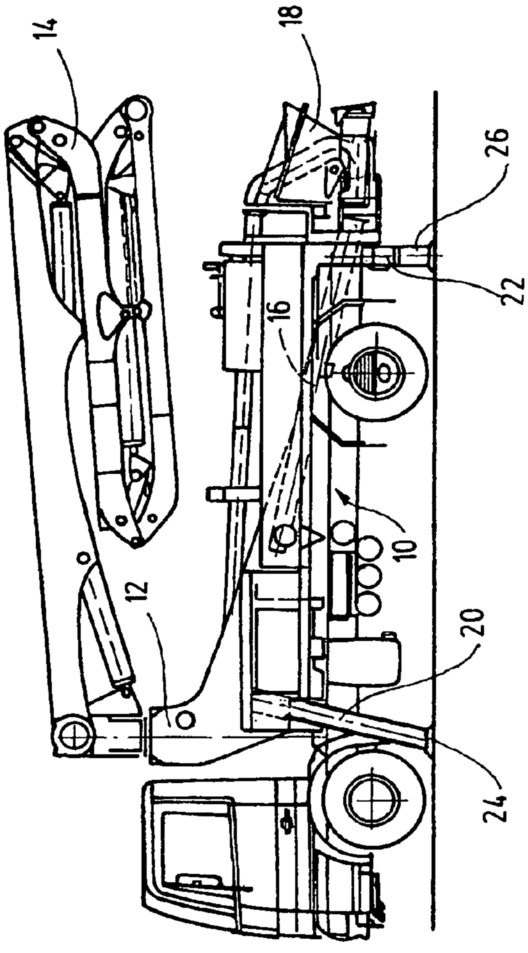

The concrete pump truck shown in the travel position in FIG. 1*a* and in the raised operational position in FIG. 1*b* consists essentially of a two-axle chassis 10, a concrete distributor mast 14 of a thick-matter pump 16, mounted to rotate about a vertical axis, on a mast pedestal 12, with material application container 18 and a support construction that consists of two front and two rear support legs 20, 22. The support legs 20, 22 can each be supported on the ground 27 with a foot part 24, 26 that can be extended down, raising the chassis 10 (FIG. 1*b*). In the extended state of the foot parts 24, 26, the wheels 11 of the chassis are raised off the ground 27.

The support construction shown is particularly intended for small concrete distributor masts having a reach of up to 25 m. The front support legs 20 engage into a cavity 30 of a traverse-like structure 32 affixed to the chassis, with their upper telescope segment, configured as an extension tube 28, and are mounted to pivot there, about an essentially horizontal pivot axis 34, between a folded-in travel position and a folded-out working position. The pivot axes 34 are oriented at a slant relative to the longitudinal chassis axis, in such a manner that the front support legs 20 are pivoted out with their foot part pointing forward at a slant in the travel direction. A locking mechanism 36 that can be activated by hand ensures that the front support legs 20 are locked in place on the structure 32 that is affixed to the chassis, both in the folded-in and in the folded-out end position. Pivoting of the support legs 20 also takes place by hand. For this reason, a handle 38 that points outward is disposed on the extension tube 28 of the support legs 20, in each instance.

A particular feature of the invention consists in the fact that the extension tube 28 is configured in the manner of a two-arm lever, forming a lower lever arm 40, with reference to the pivot axis 34, which contains the foot part 24, and an upper lever arm 42. The foot part 24 can be displaced in telescope-like manner, under the effect of a hydrocylinder 44, in the region of the lower lever arm 40 of the extension tube 28. For this purpose, the hydrocylinder 44 is fixed in place on the foot part 24 with the rear end 46 of its cylinder, in the region of the pivot axis 34 of the extension tube 28, and with the end 48 of its rod 50. The upper lever arm 42 of the extension tube 28 engages into a guide link 54 affixed to the chassis with a slide shoe 52 that projects to the rear; the guide link forms a stop 56 for the slide shoe 52 and thus for the transfer of the support forces in the extended state of the support leg 20, at its one end. The pivoting movements of the front support legs 20 between the folded-in and the folded-out end position is spring-supported. For this purpose, a gas pressure spring 58 is articulated onto the upper lever arm 42 with its one end 60, and articulated onto the chassis with its other end 62. In this connection, the gas pressure spring 58 is oriented in such a manner that during the folding-out process, a dead point is traversed. In this way, the result is achieved that the support leg 20 is positioned in a stable contact position both in the folded-in and in the folded-out end position. The gas pressure spring 58 primarily has the function of a pivoting-out aid that eliminates the weight force of the support leg 20 when it is being pivoted out.

The pivot angle of the front support legs amounts to approximately 25° in the case of the exemplary embodiment shown (cf. FIG. 6). Accordingly, the foot plate 25 rigidly disposed on the foot part is inclined by an angle that corresponds to the pivot angle, as compared with the extension direction of the foot part. The foot plate 25 stands on a level surface in planar manner in the pivoted-out state. Fundamentally, it is possible to use a foot plate 25 that has limited articulation, and automatically adjusts to the surface of the substratum when it is set onto a substratum, in place of the rigid foot plate 25.

In summary, the following should be stated: The invention relates to a mobile work machine, particularly a concrete pump truck. The work machine comprises a chassis 10 that has at least four wheels 11 that belong to a wheel axle, in pairs. Furthermore, at least two support legs 20 disposed laterally on the chassis, in pairs, are provided, which legs have a telescope segment configured as an extension tube 28 articulated onto the chassis 10, and a foot part 24 that can be extended downward, in telescope-like manner, and supported on the ground, preferably by hydraulic means. In order to guarantee simple handling of the support mechanism, it is proposed, according to the invention, that the extension tube 28 of the support legs 20 is configured in the manner of a two-arm lever, forming a lower lever arm 40, with reference to the pivot axis 34, which contains the foot part 24, and an upper lever arm 42, preferably spring-supported in the pivoting-out direction.

The invention claimed is:

1. Mobile work machine having a chassis (10), having at least two support legs (20) disposed laterally on the chassis, in pairs, which legs have an extension tube (28) articulated onto a location on the chassis, and a foot part (24) that can be extended downward, in telescope-like manner, and supported on the ground, whereby the extension tube (28) is configured in the manner of a two-arm lever, forming a lower lever arm (40), with reference to the pivot axis (34), which contains the foot part (24), and an upper lever arm (42), wherein the upper lever arm (42) engages into a guide link (54) in the region of a free end of the upper lever arm (42), an end of the guide link (54) forming an end stop (56), wherein a pressure spring preferably configured as a gas pressure spring (58) engages onto the extension tube (28) of the support leg (20) in a region of the upper lever arm (42), and wherein the support leg (20) overcomes a dead point of the pressure spring (58) on a pivot path of the support leg between the folded-in and the folded-out end position.

2. Work machine according to claim 1, wherein the pivot axis (34) is oriented at a slant to the longitudinal chassis axis.

3. Work machine according to claim 1, wherein the pivot axes (34) of the front support legs (20) converge in the travel direction of the chassis, so that the front support legs point forward at a slant in the pivoted-out state.

4. Work machine according to claim 1, wherein the support leg (20) is spring-supported in the pivoting-out direction.

5. Work machine according to claim 1, wherein the support leg (20) is biased against a stop or a catch position under the effect of the pressure spring, both in the folded-in and in the folded-out end position.

6. Work machine according to claim 1, wherein the lower lever arm (40) of the extension tube (28) is longer than the upper lever arm (42).

7. Work machine according to claim 1, wherein the end stop (56) is affixed to the chassis, and wherein the upper lever arm (42) rests against the end stop in the region of the free end of the upper lever arm (42) in the pivoted-out state of the support leg (20).

8. Work machine according to claim 1, wherein the pivot angle of the support legs (20) about the pivot axis (34) amounts to 20' to 30'.

9. Work machine according to claim 8, wherein the foot part (24) carries a rigid foot plate (25), which is inclined by an angle that corresponds to the pivot angle, relative to the extension direction of the foot part.

10. Work machine according to claim 1, wherein the foot part (24) carries a foot plate (25) that can pivot in limited manner, by way of a foot joint.

11. Work machine according to claim 1, wherein a handle (38) that points in the pivoting-out direction is disposed on the outside of the extension tube.

12. Work machine according to claim 1, wherein the support leg (20) can be locked in place relative to the chassis, by means of a preferably manually activated locking mechanism, both in the folded-in and in the folded-out position.

* * * * *

UNITED STATES PATENT AND TRADEMARK OFFICE

CERTIFICATE OF CORRECTION

PATENT NO. : 8,087,695 B2
APPLICATION NO. : 12/223213
DATED : January 3, 2012
INVENTOR(S) : Fügel et al.

It is certified that error appears in the above-identified patent and that said Letters Patent is hereby corrected as shown below:

In the Claims:

In particular in Column 4, line 42 (Line 3 of Claim 8) please change "20' to 30'" to correctly read: --20° to 30°--.

Signed and Sealed this
Third Day of September, 2013

Teresa Stanek Rea
*Acting Director of the United States Patent and Trademark Office*